Patented Feb. 8, 1927.

1,617,230

UNITED STATES PATENT OFFICE.

SERGE APOSTOLOFF, OF BROOKLYN, NEW YORK, ASSIGNOR TO UNION DRY BATTERY CORPORATION OF AMERICA, OF NEW YORK, N. Y., A CORPORATION OF DELAWARE.

ELECTRIC CELL.

No Drawing.  Application filed September 6, 1924. Serial No. 736,357.

This invention relates to electric cells; and it comprises a cell of the Leclanche type provided with a depolarizing mass or body comprising "activated" carbon or carbon of the "decolorizing carbon" type; all as more fully hereinafter set forth and as claimed.

In the Leclanche type of primary cell for open circuit work, the negative and positive poles are of zinc and carbon, respectively, with a solution of sal-ammoniac (ammonium chlorid), or of a mixture of sal-ammoniac and zinc chlorid, as the electrolyte. Adjacent the carbon and in electric contact therewith, is a body or mass of depolarizing material; this material being always, or nearly always, of manganese dioxid ($MnO_2$); usually with admixture of a little graphite to improve the conductivity. The mass is bonded with any suitable binder and may contain sal-ammoniac crystals. In the ordinary "flashlight" cells, B-batteries, etc., the structure is as described, with the exception that the electrolyte is given a pasty consistency by some such colloid material as starch, or any other farinaceous material.

It is the purpose of the present invention to improve on this type of cell by incorporating into the depolarizing body a small amount of "activated carbon" or "decolorizing carbon." Ordinary charcoal is not a very good adsorbing body for taking up gases or abstracting dissolved bodies from liquids, nor is it particularly active as an oxidizing catalyst. Its properties in both respects may be materially improved by reburning or temporary exposure to high temperatures in the presence of oxidizing bodies, such as superheated steam, high temperature carbon dioxid (products of combustion), etc. It is presumed that ordinary charcoal carries a layer of hydrocarbons or the like covering its surfaces and nullifying their activity. By high temperature treatment of the character indicated, these impurities are removed. "Activated carbon" and "decolorizing carbon" are both made in this way and for the present purposes are the same thing; the difference being more in the use and in the fineness of grain than in the material itself. Whatever the reason, activated carbon and decolorizing carbon are far more active as adsorbents and as oxidizing catalysts, than is ordinary charcoal. Instead of using charcoal for preparing these materials, various other carbons, such as those from lignite, may be used. Or the basis may be a specially treated mixture of wood with other things. Activated carbon and decolorizing carbon are now on the market for various purposes. The former is generally of coarser texture than the latter and is used largely for treating gases, where it acts on the gas mask principle. Decolorizing carbon is generally finer and is used more extensively in purifying liquids. For this purpose, its activity may be many times that of the best known prior preparations, the bone chars.

I have found that an addition of decolorizing carbon, or better, activated carbon, to the depolarizing mass or body in the Leclanche type of cell very much improves the regularity of performance and enables better utilization of the depolarizing body. This I ascribe in part to its adsorbent power in taking up gases ($NH_3$, etc.) and in part to its oxidizing power, enabling it to reinforce the manganese dioxid. Whatever the reason, an addition of decolorizing carbon or of activated carbon of the commercial varieties to the depolarizing mass, even in percentages as low as 7.5 per cent enables a free evolution of current on closing the circuit with a slower lag in voltage than is customary with cells of this type, a better utilization of the manganese dioxid, with concomitant increase in length of life of the cell and less difficulty from gas evolution and "bulging." The amount may be greater than that indicated and may be even as high as 72 per cent.

Either activated carbon or decolorizing carbon may be employed but, in general, I find the former more advantageous. The carbon is worked into the composition at the time the depolarizing mass is made. For example, a mixture of 62 parts of manganese dioxid of any of the commercial grades, 27 parts of flake graphite and 11 parts sal-ammoniac as a binder, with enough water to make the mass plastic, may receive an addition of 19 parts of fine commercial decolorizing carbon. The composite mass is molded into form, usually about an axial carbon pole piece, and dried in the usual manner. It is used in the usual way.

What I claim is:—

1. A cell of the Leclanche type comprising a depolarizing mass containing manganese dioxid and activated carbon.

2. A cell of the Leclanche type comprising a depolarizing mass containing manganese dioxid and activated carbon of the decolorizing carbon type.

In testimony whereof, I have hereunto affixed my signature.

SERGE APOSTOLOFF.